United States Patent
Komine

(10) Patent No.: US 10,843,478 B2
(45) Date of Patent: Nov. 24, 2020

(54) PRINTING APPARATUS AND METHOD OF CONTROLLING SAME

(71) Applicant: CANON KABUSHIKI KAISHA, Tokyo (JP)

(72) Inventor: Isao Komine, Sagamihara (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/294,315

(22) Filed: Mar. 6, 2019

(65) Prior Publication Data
US 2019/0283439 A1    Sep. 19, 2019

(30) Foreign Application Priority Data
Mar. 13, 2018   (JP) .................... 2018-045930

(51) Int. Cl.
*G03G 15/08*    (2006.01)
*B41J 2/175*    (2006.01)
*G06Q 30/06*    (2012.01)

(52) U.S. Cl.
CPC ....... *B41J 2/17566* (2013.01); *B41J 2/17503* (2013.01); *G06Q 30/0601* (2013.01)

(58) Field of Classification Search
CPC ........................... G06Q 10/087; G06F 3/1204
USPC ............................................ 399/27
See application file for complete search history.

(56) References Cited

U.S. PATENT DOCUMENTS

2003/0040984 A1*  2/2003  Inami ................... G06Q 10/087
                                                    705/26.82
2013/0028616 A1*  1/2013  Kunihiro ............... G06F 3/1204
                                                    399/27

FOREIGN PATENT DOCUMENTS

JP       2001-297237 A    10/2001

* cited by examiner

*Primary Examiner* — Lam S Nguyen
(74) *Attorney, Agent, or Firm* — Venable LLP

(57) ABSTRACT

A printing apparatus to which plural ink tanks can be attached includes a print unit performing printing using ink of plural colors, a first determination unit to determine that a remaining amount of ink in any of plural ink tanks is lower than a predetermined amount, and a second determination unit to determine that order information for the ink tank has been transmitted to a server, based on a memory provided in the ink tank that stores predetermined information. When it is determined the remaining amount of a predetermined ink tank is less than the predetermined amount and the order information for the predetermined ink tank is yet to be transmitted, order information is transmitted for the predetermined ink tank, to the server, based on detection that an ink tank is attached to the printing apparatus.

22 Claims, 6 Drawing Sheets

# PRINTING APPARATUS AND METHOD OF CONTROLLING SAME

BACKGROUND OF THE INVENTION

Field of the Invention

The present invention relates to a printing apparatus that performs printing using consumable parts, and a method of controlling the same.

Description of the Related Art

Japanese Patent Laid-Open No. 2001-297237 discloses a consumable part order system that automatically detects a remaining amount of a consumable part of a printer, automatically decides an order amount from the obtained remaining amount of the consumable part, and automatically orders a consumable part.

However, in a consumable part order system as recited in Japanese Patent Laid-Open No. 2001-297237, there is a need to prevent an order from being made duplicative in spite of the fact that a consumable part has already been ordered.

SUMMARY OF THE INVENTION

The present invention provides a printing apparatus that suppresses a consumable part being ordered in duplicate, and a method of controlling the same.

The present invention has the following configuration.

In other words, according to one aspect of the present invention, there is provided a printing apparatus, comprising: a print unit configured to perform printing using a consumable part; a determination unit configured to determine that a remaining amount of the consumable part in a container that houses the consumable part is lower than a predetermined amount; and a controller configured to, upon a condition where it is determined by the determination unit that the remaining amount of the consumable part is less than the predetermined amount and it is determined that order information for the consumable part is yet to be transmitted, cause the order information of the consumable part to be transmitted externally by a transmitter, and cause a memory provided in the container to store information indicating that the order information has been sent, wherein, if the information indicating that the order information has been sent is not stored in the memory, the controller determines that the order information is yet to be transmitted.

By virtue of the present invention, it is possible to suppress consumable parts being ordered in duplicate.

Further features of the present invention will become apparent from the following description of exemplary embodiments (with reference to the attached drawings).

DESCRIPTION OF THE EMBODIMENTS

First Embodiment

Configuration of Printing Apparatus

Figure 1:
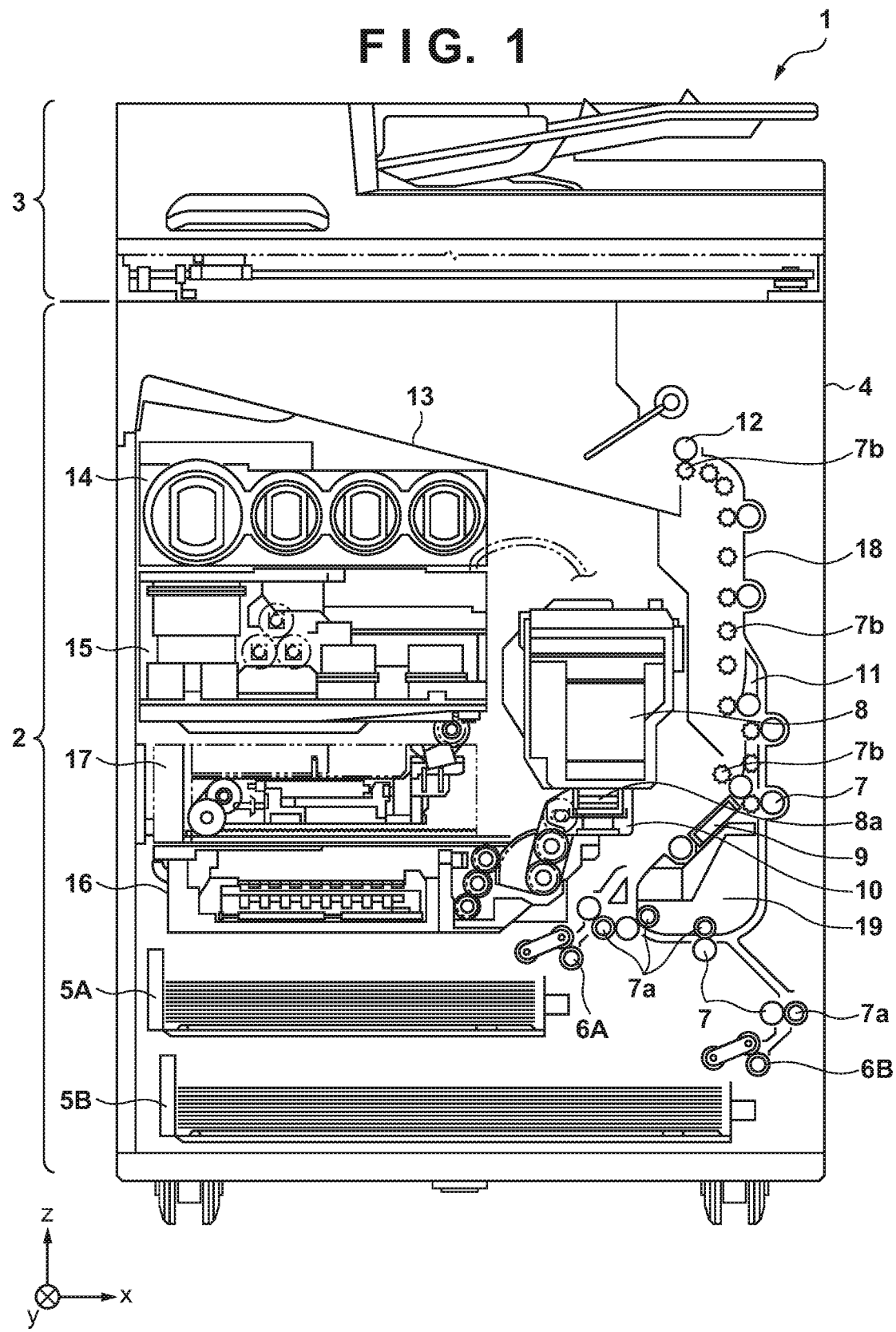
FIG. 1 is a view for when a printing apparatus is in a standby state.

FIG. 1 is an internal configuration diagram of an inkjet printing apparatus 1 (hereinafter referred to as the printing apparatus 1) used in the present embodiment. In FIG. 1, an x direction indicates a horizontal direction, a y direction (a direction perpendicular to a sheet surface) indicates a direction in which discharge ports in a printhead 8 which is described later are arrayed, and a z direction indicates a vertical direction.

The printing apparatus 1 is a multifunction peripheral provided with a printer unit 2 and a scanner unit 3 and can execute various processing relating to a printing operation or a reading operation by the printer unit 2 or the scanner unit 3 individually, or by the printer unit 2 and the scanner unit 3 interworking. The scanner unit 3 is provided with an ADF (an automatic document feeder) and an FBS (a flatbed scanner) and can read (scan) an original that is automatically fed by the ADF and read an original that is placed on an original platen of the FBS by a user. Note that the present embodiment is for a multifunction peripheral that has both the printer unit 2 and the scanner unit 3, but a configuration in which it is not provided with the scanner unit 3 is also possible. FIG. 1 indicates a standby state in which the printing apparatus 1 is not performing a printing operation or a reading operation.

In the printer unit 2, a first cassette 5A and a second cassette 5B, which are for housing print media (cut sheets) S, are detachably set in a bottom portion that is downward in a vertical direction in a housing 4. Comparatively small print media up to an A4 size is flat stacked and housed in the first cassette 5A, and comparatively large print media up to an A3 size is flat stacked and housed in the second cassette 5B. A first feed unit 6A for separating housed print media one sheet at a time and feeding the print media is provided near the first cassette 5A. A second feed unit 6B is similarly provided near the second cassette 5B. When a printing operation is performed, a print medium S is selectively fed from one of these cassettes.

Conveyance rollers 7, a discharge roller 12, pinch rollers 7a, spurs 7b, a guide 18, an inner guide 19, and a flapper 11 are conveyance mechanisms for guiding a print medium S in a predetermined direction. The conveyance rollers 7 are driving rollers that are arranged upstream of the printhead 8 and are driven by a conveyance motor (not shown). The pinch rollers 7a are driven rollers that nip the print medium S together with the conveyance rollers 7 and rotate. The discharge roller 12 is a driving roller that is arranged downstream of the printhead 8 and is driven by a conveyance motor (not shown). A spur 7b nips the print medium S together with the discharge roller 12 to convey the print medium S.

The guide 18 is provided on a conveyance path for the print medium S and is for guiding the print medium S in a predetermined direction. The inner guide 19 has a side surface that curves by a member that extends in the y direction and guides a print medium S along the side surface. The flapper 11 is a member for switching a direction in which the print medium S is conveyed at the time of a double-sided printing operation. A discharge tray 13 is a tray for holding, in a stack, print media S discharged by the discharge roller 12 after a printing operation completes.

The printhead 8 of the present embodiment is a full-line type color ink jet printhead, and a plurality of discharge ports for discharging ink in accordance with print data are arranged in an amount that corresponds to the width of a print medium S along the y direction in FIG. 1. When the printhead 8 is at a standby position, a discharge port surface 8a of the printhead 8 is capped by a cap unit 10 as in FIG. 1. When a printing operation is performed, the orientation of the printhead 8 is changed so that the discharge port surface 8a faces a platen 9 by a print controller 202 which is described later. The platen 9 is configured by a flat plate that extends in the y direction, and holds, by a back surface, a print medium S to which a printing operation is to be performed by the printhead 8. Movement of the printhead 8 from the standby position to the printing position is described in detail later.

An ink tank unit 14 contains ink of each of four colors that is supplied to the printhead 8. An ink supply unit 15 is provided partway along a flow path that connects the ink tank unit 14 and the printhead 8 and adjusts a flow rate and pressure of ink within the printhead 8 to appropriate ranges. In the present embodiment, a circulatory ink supply system is employed, and the ink supply unit 15 adjusts the pressure of ink supplied to the printhead 8 and a flow rate of ink recovered from the printhead 8 to appropriate ranges.

A maintenance unit 16 is provided with the cap unit 10 and a wiping unit 17 and causes these to operate at predetermined timings to perform a maintenance operation with respect to the printhead 8. The maintenance operation is described in detail later.

Control Configuration (Controller Unit)

Figure 2:
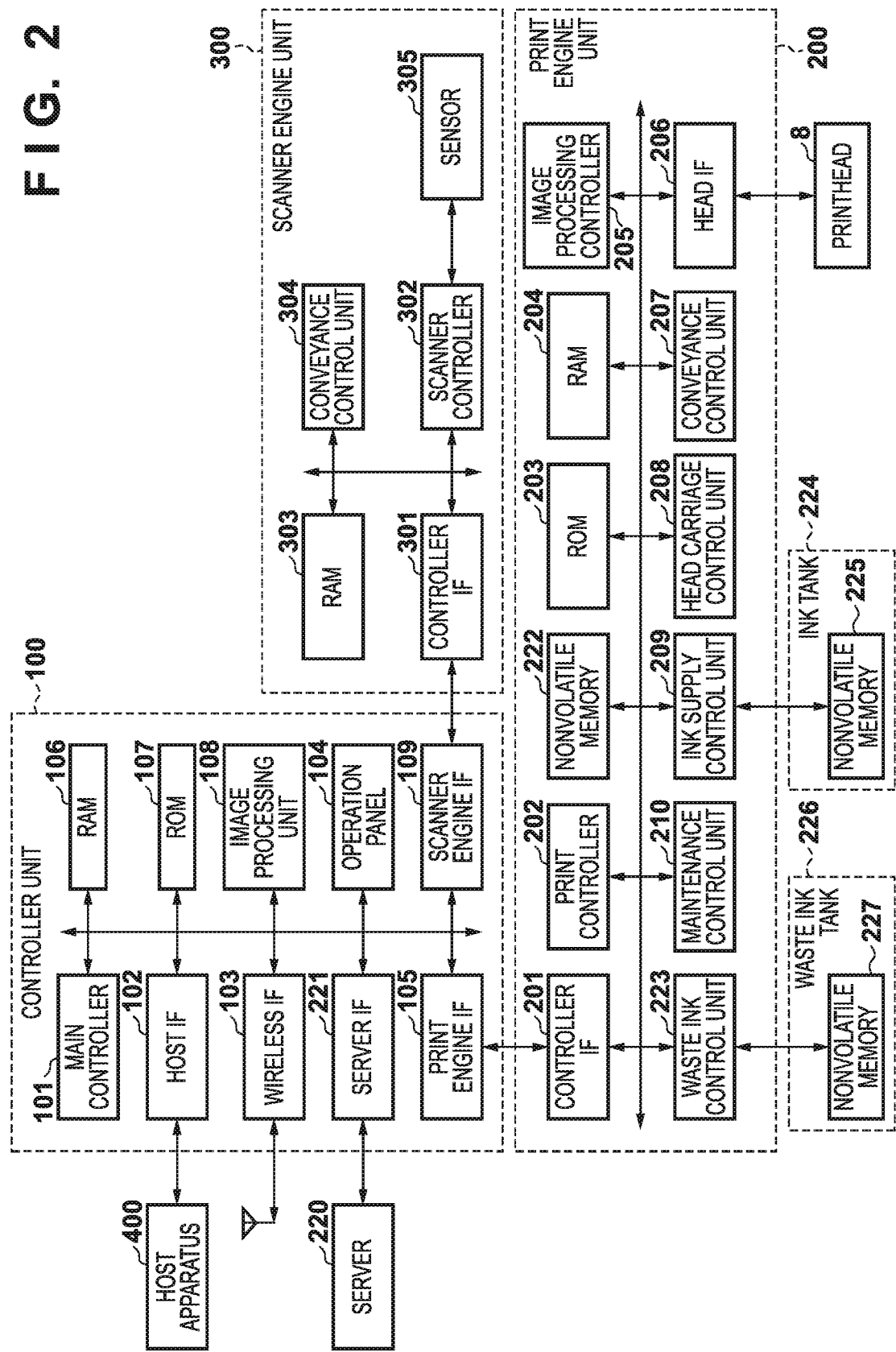
FIG. 2 is a control configuration diagram for the printing apparatus.

FIG. 2 is a block diagram illustrating a control configuration in the printing apparatus 1. The control configuration is configured by a print engine unit 200 that mainly controls the printer unit 2, a scanner engine unit 300 that controls the scanner unit 3, and a controller unit 100 that controls the entirety of the printing apparatus 1. The print controller 202 controls various mechanisms of the print engine unit 200 in accordance with an instruction by a main controller 101 of the controller unit 100. Various mechanisms of the scanner engine unit 300 are controlled by the main controller 101 of the controller unit 100. Details of the control configuration are described below.

In the controller unit 100, the main controller 101 which is configured by a CPU controls the entirety of the printing apparatus 1 in accordance with a program and various parameters stored in a ROM 107, while taking a RAM 106 as a work area. For example, when a print job is inputted from a host apparatus 400 via a host I/F 102 or a wireless I/F 103, predetermined image processing is performed on image data received by an image processing unit 108, in accordance with an instruction by the main controller 101. The main controller 101 transmits image data resulting from image processing to the print engine unit 200, via a print engine I/F 105.

Note that the printing apparatus 1 may obtain the image data from the host apparatus 400 via wireless communication or wired communication and may obtain image data from an external storage apparatus (such as a USB memory) that is connected to the printing apparatus 1. A communication method used in the wireless communication or the wired communication is not limited. For example, it is possible to apply Wi-Fi (Wireless Fidelity) (registered trademark) or Bluetooth (registered trademark) as a communication method used in wireless communication. In addition, it is possible to apply USB (Universal Serial Bus) or the like as a communication method used in wired communication. In addition, when a read command is inputted from the host apparatus 400, for example, the main controller 101 transmits this command to the scanner unit 3 via a scanner engine I/F 109.

An operation panel 104 is a mechanism for a user to perform input and output with respect to the printing apparatus 1. Via the operation panel 104, a user can make an instruction for an operation such as copying or scanning, set a print mode, or recognize information of the printing apparatus 1. In addition, the controller unit 100 is also provided with a server interface (I/F) 221 that is connected with a server 220 for performing, for example, processing to receive an order for a consumable part.

Control Configuration (Print Engine Unit)

In the print engine unit 200 the print controller 202 which is configured by a CPU controls various mechanisms provided in the printer unit 2 in accordance with a program and various parameters stored in a ROM 203, while taking a RAM 204 as a work area. When various commands or image data are received via a controller I/F 201, the print controller 202 temporarily saves them in the RAM 204. The print controller 202 causes the image processing controller 205 to convert saved image data to print data so that the printhead 8 can use it for a printing operation. When print data is generated, the print controller 202 causes, via a head I/F 206, the printhead 8 to execute a printing operation based on the print data. At this point, the print controller 202, via the conveyance control unit 207, drives the feed units 6A and 6B, the conveyance rollers 7, the discharge roller 12, and the flapper 11, which are illustrated in FIG. 1, to convey a print medium S. In accordance with an instruction by the print controller 202, the printing operation by the printhead 8 is executed in conjunction with the conveyance operation of the print medium S, and print processing is performed.

A head carriage control unit 208 changes the orientation or position of the printhead 8 in accordance with an operational state of the printing apparatus 1 such as a maintenance state or a print state. An ink supply control unit 209 controls the ink supply unit 15 so that pressure of ink supplied to the printhead 8 falls within an appropriate range. In response to a request from the print controller 202, the ink supply unit 15 also replies with a remaining ink amount of an ink tank 224 which has a nonvolatile memory 225. The ink tank 224 can be detached from the printing apparatus body. The ink supply unit 15 can obtain information about a remaining ink amount detected by a remaining ink amount sensor (not shown) and notify this amount to the print controller 202 in response to a request. A maintenance control unit 210 controls operation of the cap unit 10 or the wiping unit 17 in the maintenance unit 16 when performing a maintenance operation with respect to the printhead 8.

The print engine unit 200 is also provided with a nonvolatile memory 222 for storing a predetermined amount indicating a lower-limit value of a remaining ink amount, for example. This lower-limit value may be determined in advance, and may be a value designated from the operation panel 104. The print engine unit 200 also has a waste ink control unit 223 for performing, for example, management of a remaining capacity of a waste ink tank 226 which houses waste ink. The waste ink tank 226 is provided with a nonvolatile memory 227, and stores an order history, for example.

Control Configuration (Scanner Engine Unit)

In the scanner engine unit 300, the main controller 101 controls the hardware resources of a scanner controller 302 in accordance with a program and various parameters stored in the ROM 107, while taking the RAM 106 as a work area. By this, the various mechanisms provided in the scanner unit 3 are controlled. For example, the main controller 101 controls a hardware resource inside the scanner controller 302 via a controller I/F 301, to convey, via a conveyance control unit 304, an original loaded into the ADF by a user and read it by a sensor 305. The scanner controller 302 saves image data that was read in the RAM 303. Note that the print controller 202 can convert obtained image data to print data as described above to thereby cause the printhead 8 to execute a printing operation based on the image data read by the scanner controller 302.

Note that configuration may be taken such that a program for realizing one or more functions of the host apparatus 400 or the printing apparatus 1 of the present embodiment is supplied to a system or an apparatus via a network or various storage mediums, and a computer (a CPU, an MPU, or the like) of the system or apparatus reads the program to execute the function or causes various mechanisms to execute the function. In addition, this program may be executed by one computer and may be executed by a plurality of interworking computers. In addition, it is not necessary to realize all of the processing described above by software, and some or all of the processing may be realized by hardware such as an ASIC. Furthermore, there is no limitation to a form in which one CPU performs all of the processing, and there may be a form in which a plurality of CPUs perform the processing while cooperating as appropriate, and there may be a form in which one CPU executes some processing and other processing is performed by a plurality of CPUs cooperating.

Automatic Order System

The main controller 101 according to the present embodiment has an automatic order system that can automatically transmit an order or a request for delivery of an ink tank. The target of an order is given as ink in the present example, but of course anything may be taken as a target if it is a consumable part.

When there is a condition that enables an automatic order request for an ink tank to be transmitted, the main controller 101 transmits an order request to the server 220 via the server I/F 221. It is possible to add information such as a color or a serial number for identifying an ink tank to the order request, as appended data. Upon receiving the order, the server 220 performs various processing directed at delivery of a product for which it received the order, such as order reception processing, for example.

A condition that enables the automatic order system to transmit an order request is a case where that a remaining ink amount has gotten smaller than a predetermined amount decided in advance using an operation panel or the like, and that an order request has not been transmitted to the server 220 even once in the past for an ink tank that is a target of replacement are satisfied.

The ink tank 224, which is for four colors, is mounted to the ink tank unit 14. An ink tank supply control unit 209 performs polling at regular intervals and notifies a remaining amount of the ink tank 224 to the print controller 202. In addition, upon receiving a request from the print controller 202, the ink tank supply control unit can write data or read data to or from the nonvolatile memory 225 of the ink tank 224.

The nonvolatile memory 225 of the ink tank 224 can hold notification history information for whether the main controller 101 has notified an order request for an ink tank to the server 220. Writing of history information is realized by the main controller 101 making an instruction to the print controller 202 via the print engine I/F 105, and the print controller 202, upon receiving the instruction, writing to the nonvolatile memory 225 of the ink tank 224 via the ink supply control unit 209. Even if a user removes the ink tank 224 from the printing apparatus 1, the history information written to the nonvolatile memory 225 is held without being deleted.

Order Processing

Figure 3:
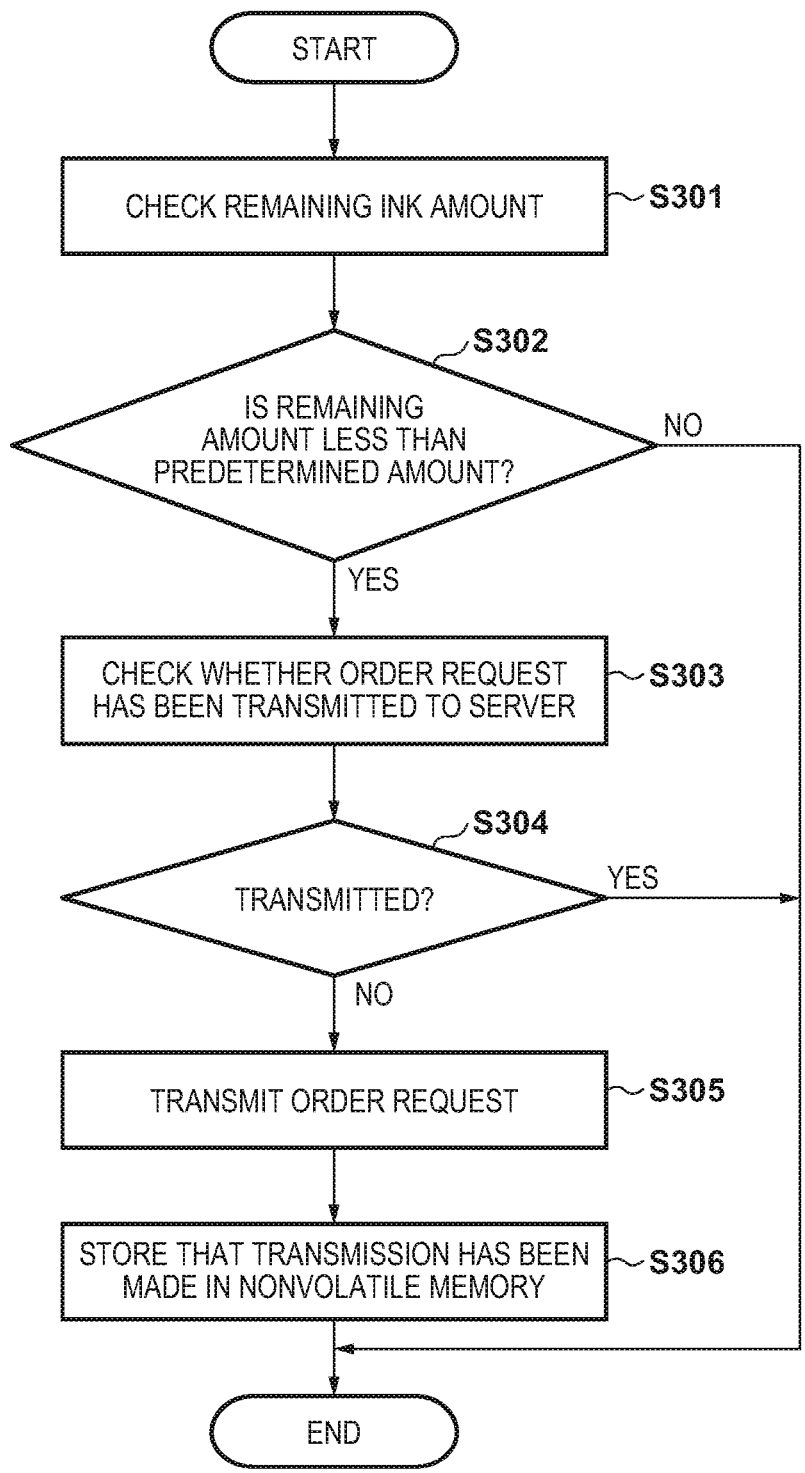
FIG. 3 is a flowchart for when automatically transmitting an order request to a server.

FIG. 3 represents a flowchart for processing for automatically transmitting an order request to the server 220 when a remaining ink amount has gotten low. This processing is executed by the print controller 202. Execution timing may be, for example, periodically, every time there is print processing for a predetermined amount such as one page, in response to an instruction from the operation panel 104, or the like. In addition, an order may also be executed if an order condition is updated.

Firstly, in step S301, the print controller 202 checks a remaining ink amount via the ink supply control unit 209. Note that a check for the remaining ink amount may be performed for each color in the present embodiment.

In step S302, the remaining amount that was checked is compared with a predetermined amount (the lower-limit value) stored in the nonvolatile memory 222.

Next, in step S303, the print controller 202, via the ink supply control unit, obtains, from the nonvolatile memory 225 of the ink tank 224 which is attached, transmission history information for an order request transmitted to the server 220 for the ink tank to be replaced (which is the ink tank 224). At shipment of the ink tank 224, the nonvolatile memory 225 either does not store a transmission history for an order, or stores that an order is yet to be transmitted.

In step S304, the print controller 202 determines whether an order request has been transmitted, based on the obtained transmission history information. For example, if information indicating that order information has been transmitted (transmission history information) is not stored, it is determined that order information is yet to be transmitted. Alternatively, if such information is stored, then it can be determined that order information has been transmitted. If order information has been transmitted, this processing ends. If order information has not been transmitted, the print controller 202 transmits an order transmission request to the main controller 101 via the controller IF 201. In step S305, the main controller 101 transmits an ink order request to the server 220 via the server IF 221. Note that the order request includes information for specifying a product to be ordered or information for specifying an orderer, for example, but this information may be stored in, for example, the ROM 107 in advance. Configuration may be taken such that, at the time of an order, if the product to be ordered, for example an ink color, is specified, order information in accordance with the specified product is selected from the stored information and added to the stored orderer information to create an order request.

In step S306, the print controller stores that an order request has been transmitted to the server as transmission history information in the nonvolatile memory 225 of the ink tank 224.

Writing of transmission history information to the nonvolatile memory 225 may be performed triggered by a reply from the server apparatus 220 for receiving the request after the main controller 101 transmits the order request to the server 220, or may be triggered by the main controller 101 completing transmission processing without depending on a reply from the server apparatus 220, for example. In any case, it is desirable for this to be performed after the order request is definitely transmitted to the server 220.

Note that the processing in step S302 through step S306 may be performed repeatedly or simultaneously for each of the plurality of colors, at the execution timing of FIG. 3. In other words, an order request is transmitted in step S305 for an ink tank of a color that satisfies an order condition, out of the ink tanks for the plurality of colors.

Figure 4:
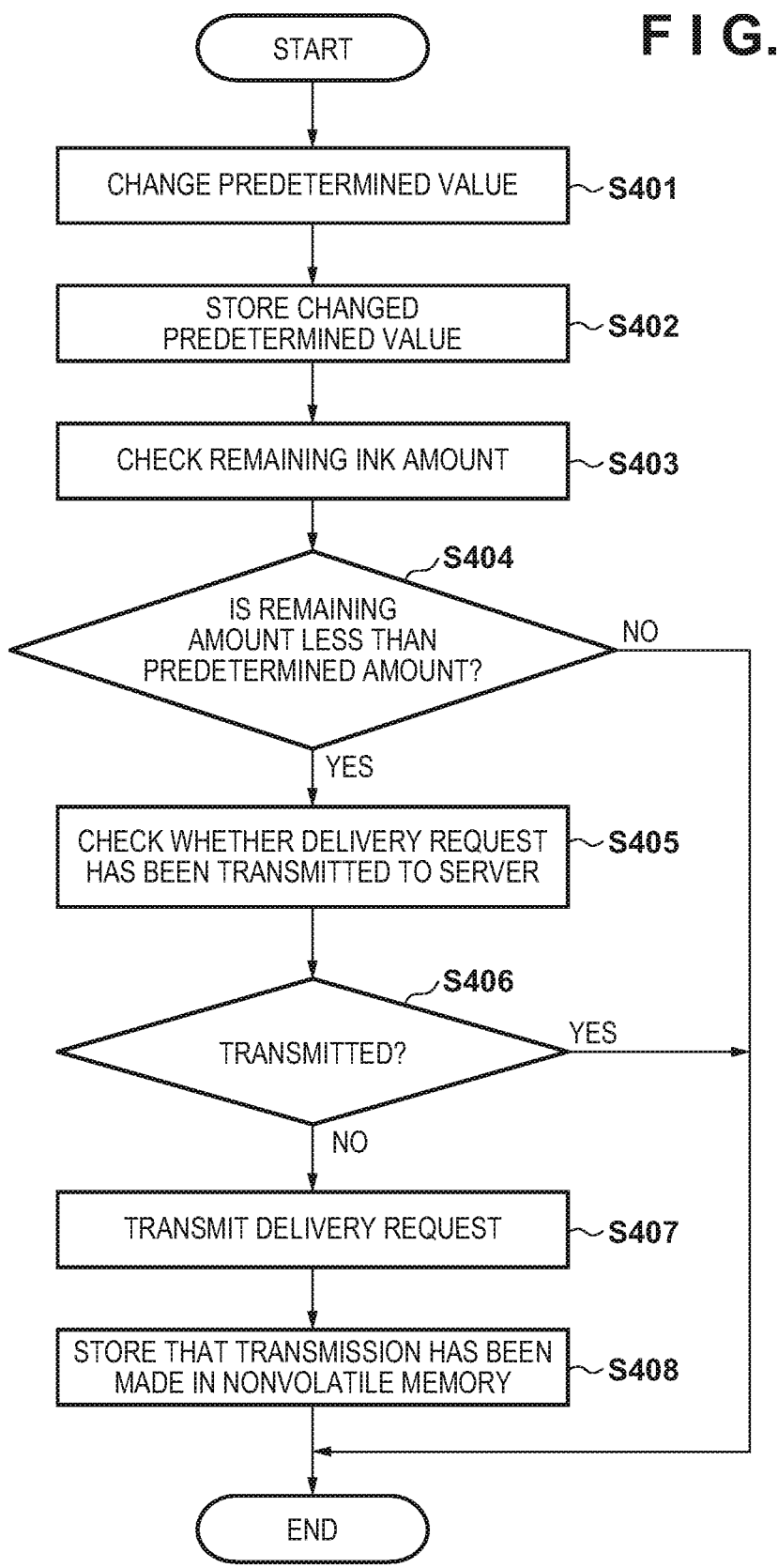
FIG. 4 is a flowchart for when automatically transmitting an order request to a server in a case where a predetermined value is changed.

FIG. 4 represents a flowchart for processing in a case where a remaining amount predetermined value is changed upon an order request being performed. The printing apparatus according to the present embodiment can change an order request in accordance with a customer. It is possible to have an amount of time for a consumable part to arrive for a customer after an order to differ per customer, and flexibly support a desire such as a customer wishing to change an order timing. Only differences with FIG. 3, including step S401 and step S402 are described.

In step S401, a user changes the predetermined value (predetermined amount) from the host apparatus 400 or the operation panel 104. In the present example, the predetermined value (predetermined amount) is a remaining ink amount for which new ink should be ordered.

Next, in step S402, the print controller 202 performs processing to store the changed predetermined value (predetermined amount) in the nonvolatile memory 222. Note that, in step S401 and step S402, configuration may be taken such that it is possible to change the predetermined value for any color that a user has selected, from a plurality of colors of ink. In other words, a remaining amount predetermined value (predetermined amount) is separately stored in the nonvolatile memory 222 for each color, and only the predetermined value (predetermined amount) that was changed in step S401 is stored in step S402.

In step S404, processing for comparing the remaining ink amount and the predetermined value (predetermined amount) is performed, but this predetermined value (predetermined amount) is the predetermined value (predetermined amount) that was changed in step S401. For example, if the remaining ink amount is 30% and the predetermined value before the change is 20%, the decision in step S404 becomes "No" and the processing ends, but if the predetermined value is changed to 40% in step S401, the decision in step S404 becomes "Yes", and the processing advances to step S405.

In step S405, the transmission history is checked, and thus whether an order request has been transmitted to a server depends on the existence or absence of a transmission history. If an order request has not been transmitted to the server 220, an order request is transmitted, and if an order request has already been made to the server 220, transmission of an order request to the server 220 is not executed even if the remaining ink amount is smaller than the predetermined value due to a change of the predetermined value.

In accordance with the present embodiment as described above, it is possible to suppress making a plurality of transmissions to a server that manages orders or manages delivery, for one ink tank.

Note that the processing of step S403 through step S408 may be limited to a color for which the predetermined value (predetermined amount) changed in step S401, from the inks of the plurality of colors, and the processing of step S403 through step S408 may be performed for all colors. In the latter case, when the predetermined value (predetermined amount) for a certain color is changed, if order information transmission information is satisfied for inks of the other colors, ink tanks for the other colors are ordered. Accordingly, even if a user does not recognize that the remaining ink amounts for the other colors are insufficient, it is possible to make an appropriate order.

In addition, in the present embodiment, the processing indicated by FIG. 3 and the processing indicated by FIG. 4 are both executed. In other words, the processing indicated by FIG. 3 is executed periodically, each time a predetermined amount of print processing is performed, in accordance with an instruction from the operation panel 104, and even if a user changes the foregoing predetermined value (predetermined amount) which is a condition for an order. At that time, the predetermined value (predetermined amount) stored in step S402 is reflected as the predetermined value (predetermined amount) in the determination processing of step S302 in FIG. 3. For example, a user can change the predetermined value (predetermined amount) used in the determination processing in step S302 for only a portion of the plurality of colors, in step S401.

The same applies when the remaining ink amount is unknown due to a power OFF or the like. Even if the remaining ink amount temporarily becomes an indefinite value, multiple transmissions of an order request to the server is suppressed by the history information.

There are consumable parts that have a life span, such as the waste ink tank 226 or the conveyance rollers 7. Here, in the case of the waste ink tank 226 it is not a remaining amount but available capacity. In the case of a consumable part that has a life span such as the conveyance rollers 7, the present embodiment is applied with a remaining usage amount or a remaining usage period with respect to the life span.

Second Embodiment

In the present embodiment, description is given for control for suppressing multiple order requests being transmitted to a server for case where a consumable part is replaced for a plurality of printing apparatuses. Only differences with the first embodiment are described.

Figure 5:
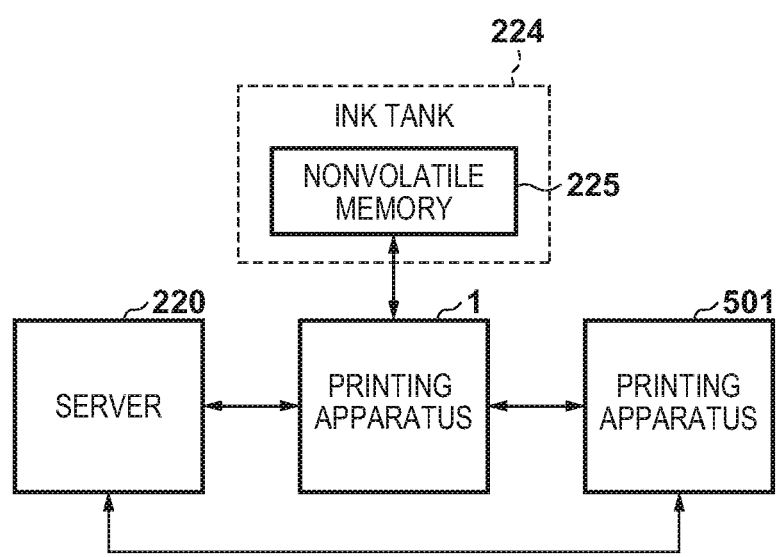
FIG. 5 is a configuration diagram for when there are a plurality of printing apparatuses.

FIG. 5 illustrates a configuration of a plurality of printing apparatuses (the printing apparatus 1 and a printing apparatus 501), the ink tank 224, and the server 220. A customer can purchase a plurality of printing apparatuses and install this plurality of printing apparatuses in an office, for example. The ink tank 224 can be used for either of the plurality of printing apparatuses.

For example, when an ink tank that has a low remaining amount is mounted to a plurality of printing apparatuses, each printing apparatus that detects the remaining amount transmits an order request to the server, triggered by the remaining amount being low. In such a case, a plurality of order requests are transmitted to the server for the ink tank whose remaining amount is low, and there are cases where this differs from a user's intent. For example, a user may wish to use ink of the printing apparatus 1 by remounting it to the printing apparatus 501. In such a case, it was possible for, after ink is ordered by the printing apparatus 1 before the ink tank is remounted, ink to be ordered by the printing apparatus 501 for the same ink tank after the ink tank is remounted.

In the printing apparatus according to the present embodiment, it is possible to suppress multiple order requests being transmitted to the server 220 even in such a case, by holding history information for whether an order request has been transmitted to the server 220 in the nonvolatile memory 225 that is configured in the ink tank 224.

Figure 6:
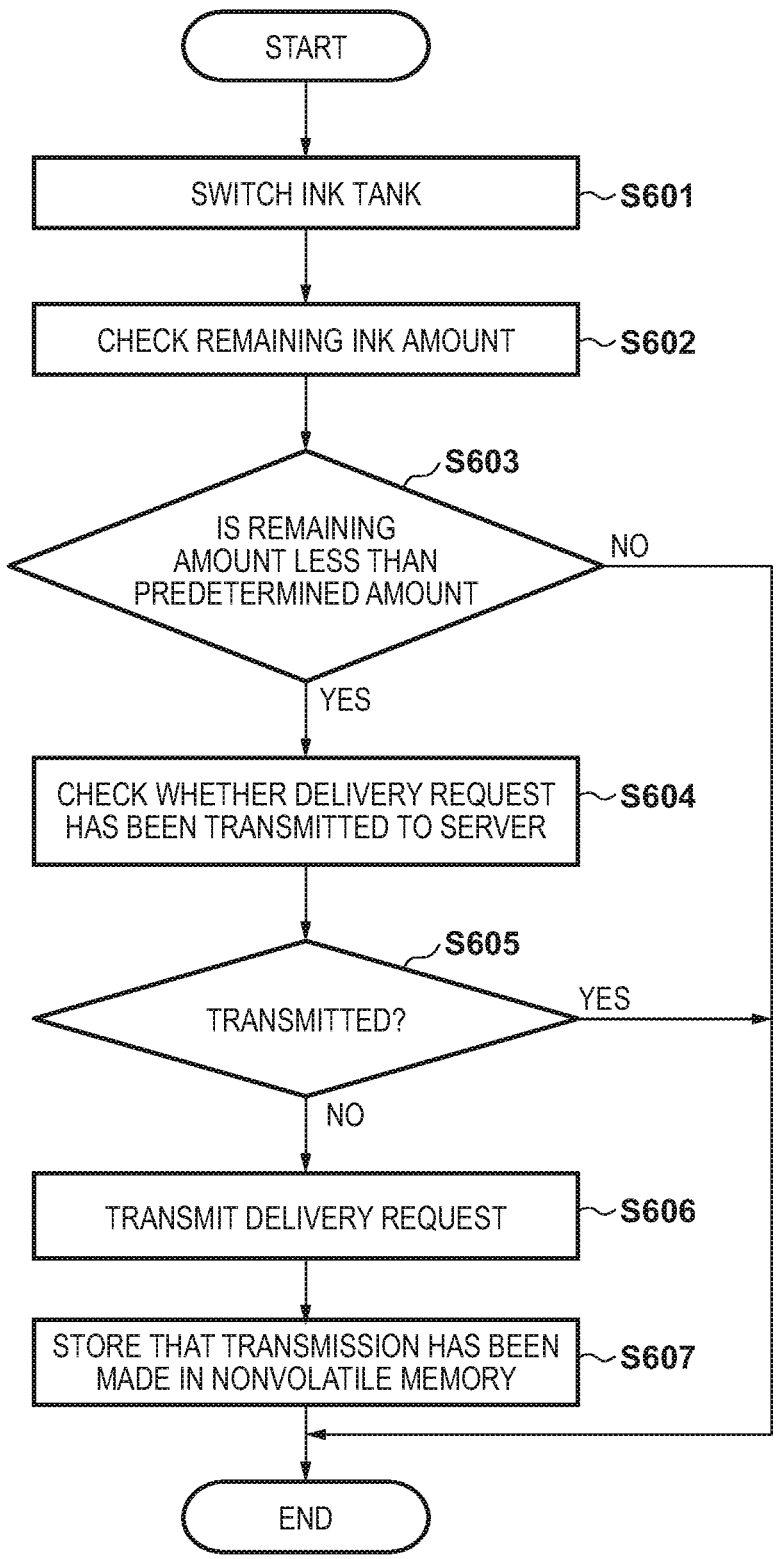
FIG. 6 is a flowchart for when automatically transmitting an order request to a server in a case where an ink tank is switched.

FIG. 6 illustrates a flowchart of processing for suppressing multiple order requests being transmitted to the server 220.

In step S601, a user switches the ink tank to a different printing apparatus. For example, this is a switch from the printing apparatus 1 to the printing apparatus 501 in FIG. 5. For example, when removal and reattachment of the ink tank is detected, the ink supply control unit 209 detects the state of the sensor itself or detects that the ink tank has been switched from the state of the sensor and notifies a result of this detection to the print controller 202. Upon receiving the notification, the print controller 202 executes processing for step S602 and thereafter.

In step S602, the remaining amount of the ink tank that was switched in step S601 is checked in the printing apparatus 501.

In step S603, the remaining amount detected in step S602 is compared with the predetermined value, and it is determined whether the remaining amount is lower than the predetermined value. In other words, the remaining amount and the predetermined value are compared even if the ink tank is switched. The processing of step S604 and thereafter which is after step S603 is similar to that of step S304 of FIG. 3 or step S404 of FIG. 4 and thereafter.

By this configuration and the control procedure, it is possible to prevent duplicate or multiple orders in excess of two, by storing order history of a new consumable part in association with a consumable part to be switched. As described in the present embodiment, even in a case where a consumable part is used in a plurality of printing apparatuses, it is possible to suppress duplicate orders. Note that history information held in a nonvolatile memory is not limited to that for an ink tank. Configuration may be taken such that, if the ink tank does not have a nonvolatile memory to which data can be written to, store information that enables the ink tank to be uniquely identified, for example, a product ID and a serial number, in association with whether or not there has been transmission of a delivery request (in other words, an order transmission history), in a nonvolatile memory of the printing apparatus 1 main body. In this way, it is possible to prevent an order request being transmitted a plurality of times for one ink tank in the same printing apparatus 1.

In such a case, when transmitting to the server 220, the history stored in the nonvolatile memory and a serial number of an ink tank currently mounted (and a product ID if it is necessary to uniquely specify the ink tank) are compared, and if it is determined that an order request has not been transmitted to the server, an order request is transmitted to the server. In such a case, the serial number may be a barcode which can only be read. The barcode is adhered to the ink tank, for example, and, for example, if the remaining ink amount is less than the predetermined amount, the serial number may be obtained by reading the barcode.

By limiting printers to which the ink tank can be mounted, it is possible to prevent duplicate orders or unnecessary delivery from being performed for one ink tank.

In a case where a plurality of printing apparatuses purchased by a customer are printing apparatuses in which ink tanks can be mounted, for example the printing apparatus 1 and the printing apparatus 501, by sharing history information transmitted to the server 220 between the printing apparatus 1 and the printing apparatus 501, it is possible to prevent an order request from being transmitted a plurality of times to the server 220 for the same ink tank by the plurality of printing apparatuses.

Note that the processing of step S602 through step S607 may be limited to the ink tank changed in step S601, from among the inks of the plurality of colors, and this processing may be performed for all ink tanks. In the latter case, when the ink tank for a certain color is changed, if order information transmission information is satisfied for the ink tanks of the other colors, ink tanks for the other colors are ordered. Accordingly, even if a user does not recognize that the remaining amounts for the ink tanks of the other colors are insufficient, it is possible to make an appropriate order.

In addition, the processing illustrated in FIG. 6 may be executed together with the processing indicated in FIG. 3 and FIG. 4. In other words, the processing indicated by FIG. 6 is executed when the ink tank is switched. In other words, the processing indicated by FIG. 3 is executed periodically or each time a predetermined amount of print processing is performed, in accordance with an instruction from the operation panel 104, and the processing illustrated in FIG. 4 is executed if a user changes the foregoing predetermined value (predetermined amount).

Other Embodiments

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-045930, filed Mar. 13, 2018, which is hereby incorporated by reference herein in its entirety.

What is claimed is:

1. A printing apparatus to which plural ink tanks can be attached, comprising:

a print unit configured to perform printing using ink of plural colors, wherein each of the plural ink tanks contains ink of one color among the plural colors;

a first determination unit configured to determine that a remaining amount of ink in any of the plural ink tanks is lower than a predetermined amount;

a transmission unit configured to transmit order information for an ink tank among the plural ink tanks, to a server;

a storing control unit configured to store predetermined information into a memory provided in the ink tank, based on the transmission unit transmitting the order information for the ink tank to the server;

a second determination unit configured to determine that the order information for the ink tank has been transmitted to the server, based on the memory provided in the ink tank storing the predetermined information; and a detection unit configured to detect that an ink tank containing ink of any of the plural colors is attached by a user to the printing apparatus, wherein, based on determinations by the first determination unit and the second determination unit that the remaining amount of ink in a predetermined ink tank is less than the predetermined amount and that the order information for the predetermined ink tank is yet to be transmitted, the transmission unit transmits the order information for the predetermined ink tank, to the server, and wherein based on the detection by the detection unit that an ink tank containing ink of any of the plural colors is attached to the printing apparatus, the determination by the first determination unit and the determination by the second determination unit are performed for one or more ink tanks which are currently attached to the printing apparatus and correspond to the plural colors.

2. The printing apparatus according to claim 1, wherein the memory is a nonvolatile memory that is provided in an ink tank.

3. The printing apparatus according to claim 1, wherein in a case where an ink tank does not hold the memory, the storing control unit stores specification information for specifying the ink tank in association with the order information in a memory of a main body of the printing apparatus, as the order information, and determines that the order information is yet to be transmitted if the predetermined information indicating that the order information has been transmitted is not stored in the memory of the main body of the printing apparatus in association with the specification information for specifying the consumable part.

4. The printing apparatus according to claim 1, wherein the predetermined amount is stored by a second memory, and can be changed.

5. The printing apparatus according to claim 4, wherein the first determination unit determines whether the remaining amount of an ink tank is less than the predetermined amount when the predetermined amount is changed.

6. The printing apparatus according to claim 1, wherein the first determination unit determines whether the remaining amount of an ink tank is less than the predetermined amount every time there has been printing for a predetermined printing amount.

7. The printing apparatus according to claim 1, wherein one or more ink tanks are specified from ink tanks which are currently attached to the printing apparatus and corresponds to the plural colors, based on the determination by the first determination unit and the determination by the second determination unit, and the transmission unit transmits the order information for the specified one or more ink tanks among the ink tanks.

8. The printing apparatus according to claim 1, wherein, based on the detection that an ink tank containing ink of any of the plural colors is attached to the printing apparatus, the determination by the first determination unit and the determination by the second determination unit are performed for all of the ink tanks which are currently attached to the printing apparatus and correspond to the plural colors.

9. The printing apparatus according to claim 1, wherein, based on the detection that an ink tank containing ink of any of the plural colors is attached to the printing apparatus, the determination by the first determination unit and the determination by the second determination unit are performed for only for the ink tank of which the attachment is detected by the detecting unit.

10. The printing apparatus according to claim 1, wherein the detection unit detects detachment and reattachment of an ink tank, and based on the detection unit detecting detachment and reattachment of an ink tank, the determination by the first determination unit and the determination by the second determination unit are performed for one or more of ink tanks which are currently attached to the printing apparatus and correspond to the plural colors.

11. The printing apparatus according to claim 1, further comprising:

a reception unit configured to receive a reply with respect to the transmission of the order information for the ink tank by the transmission unit, wherein the storing control unit is configured to store the predetermined information into the memory provided in the ink tank, based on the reception unit receiving a reply with respect to the transmission of the order information for the ink tank by the transmission unit.

12. A method of controlling a printing apparatus to which plural ink tanks can be attached, wherein the printing apparatus is operable to perform printing using ink of plural colors, and each of the plural ink tanks contains ink of one color among the plural colors, the method comprising:

determining that a remaining amount of ink in any of the plural ink tanks is lower than a predetermined amount;

transmitting order information for an ink tank among the plural ink tanks, to a server;

storing predetermined information into a memory provided in the ink tank, based on the transmission unit transmitting the order information for the ink tank to the server;

determining that the order information for the ink tank has been transmitted to the server, based on the memory provided in the ink tank storing the predetermined information; and, detecting that an ink tank containing ink of any of the plural colors is attached by a user to the printing apparatus, wherein, based on determinations that the remaining amount of ink in a predetermined ink tank is less than the predetermined amount and order information for the predetermined ink tank is yet to be transmitted, the order information for the predetermined ink tank is transmitted to the server, and wherein based on the detection that an ink tank containing ink of any of the plural colors is attached to the printing apparatus, the determinations as to the remaining amount of ink and the order information for the ink tank are performed for one or more of ink tanks which are currently attached to the printing apparatus and correspond to the plural colors.

13. The method according to claim 12, wherein the memory is a nonvolatile memory that is provided in an ink tank.

14. The method according to claim 12, wherein
in a case where an ink tank does not hold the memory, specification information for specifying the ink tank in association with the order information is stored in a memory of a main body of the printing apparatus, as the order information, and
it is determined that the order information is yet to be transmitted if the predetermined information indicating that the order information has been transmitted is not stored in the memory of the main body of the printing apparatus in association with the specification information for specifying the consumable part.

15. The method according to claim 12, wherein the predetermined amount is stored by a second memory, and can be changed.

16. The method according to claim 15, wherein, it is determined whether the remaining amount of ink in an ink tank is less than the predetermined amount when the predetermined amount is changed.

17. The method according to claim 12, wherein, it is determined whether the remaining amount of ink in an ink tank is less than the predetermined amount every time there has been printing for a predetermined printing amount.

18. The method according to claim 12, wherein one or more ink tanks are specified from ink tanks which are currently attached to the printing apparatus and correspond to the plural colors, based on the determinations as to the remaining amount of ink and the order information for the ink tank, and
the order information for the specified one or more ink tanks among the ink tanks is transmitted.

19. The method according to claim 12, wherein, based on detecting that an ink tank containing ink of any of the plural colors is attached to the printing apparatus, determining the remaining amount of ink and the order information for the ink tank for all of the ink tanks which are currently attached to the printing apparatus and correspond to the plural colors.

20. The method according to claim 12, wherein, based on detecting that an ink tank containing ink of any of the plural colors is attached to the printing apparatus, determining the remaining amount of ink and the order information only for the ink tank of which the attachment is detected.

21. The method according to claim 12, wherein detachment and reattachment of an ink tank is detected, and
based on detection of detachment and reattachment of an ink tank, determining the remaining amount of ink and the order information for the ink tank for one or more of ink tanks which are currently attached to the printing apparatus and correspond to the plural colors.

22. The method according to claim 12, further comprising:
receiving a reply with respect to the transmission of the order information for the ink tank, and
storing the predetermined information into the memory provided in the ink tank, based on a reply with respect to the transmission of the order information for the ink tank being received.

* * * * *